Dec. 2, 1924.  
A. W. BUMSTEAD  
DEMOUNTABLE RIM  
Filed Oct. 6, 1923  
1,518,047
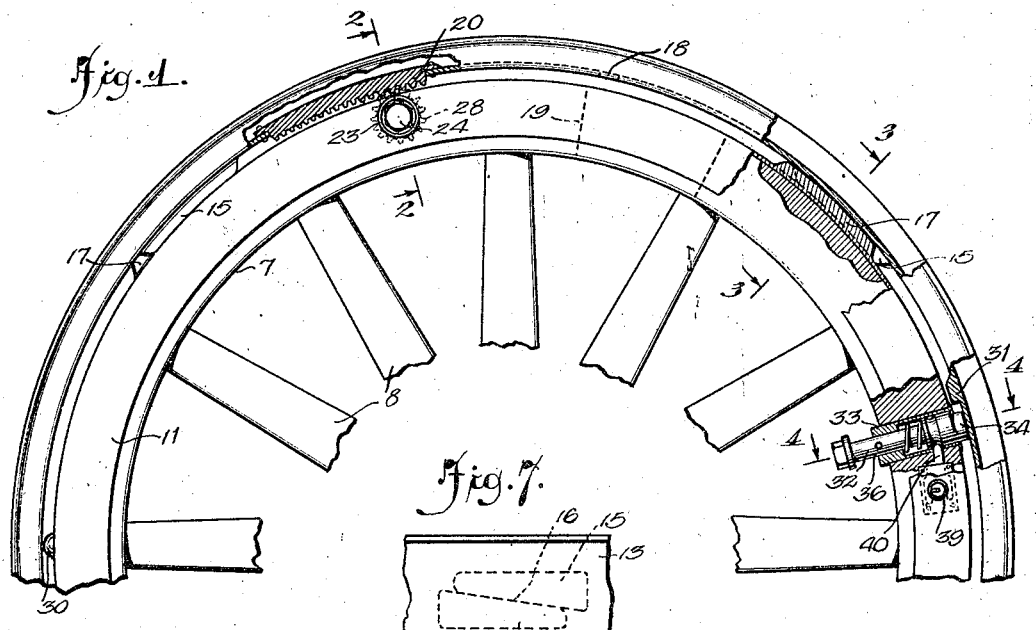
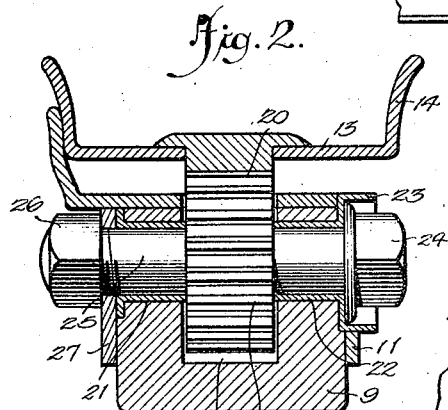
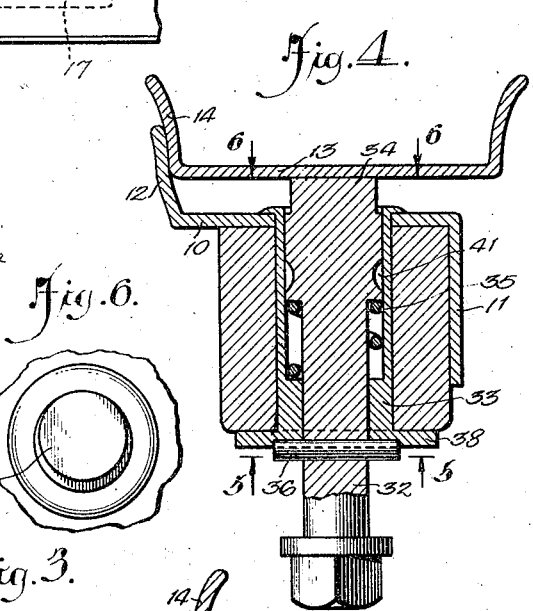
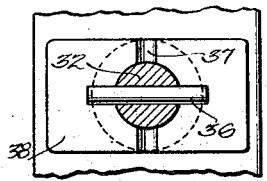
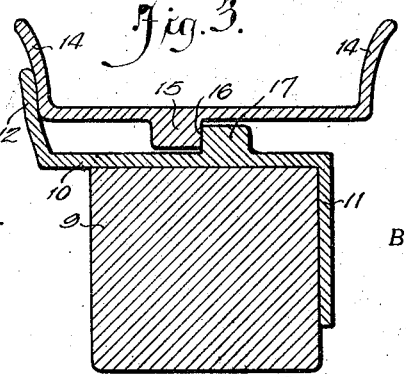
WITNESSES
INVENTOR  
A.W. BUMSTEAD  
BY  
ATTORNEYS Patented Dec. 2, 1924.

1,518,047

UNITED STATES PATENT OFFICE.

ALBERT WILLIAM BUMSTEAD, OF NEW BRITAIN, CONNECTICUT, ASSIGNOR OF ONE-HALF TO HENRY F. FISCHER, OF NEW BRITAIN, CONNECTICUT.

DEMOUNTABLE RIM.

Application filed October 6, 1923. Serial No. 667,025.

*To all whom it may concern:*

Be it known that I, ALBERT W. BUMSTEAD, a citizen of the United States, and a resident of New Britain, in the county of Hartford and State of Connecticut, have invented a new and Improved Demountable Rim, of which the following is a full, clear, and exact description.

This invention relates to improvements in vehicle wheels, and has particular reference to a demountable rim therefor.

An object of the invention is to provide a demountable rim of simple and durable construction, which may be readily and quickly removed from a wheel and applied thereto and which, when in its operative position, will be securely held against lateral or circumferential displacement with respect to the wheel.

Another object is to provide a locking device for the rim which will render it extremely difficult for unauthorized persons to remove the rim and tire mounted thereon from the wheel.

The above and other objects will appear more clearly from the following detail description when taken in connection with the accompanying drawing, which illustrates a preferred embodiment of the inventive idea.

In the drawing—

Figure 1 is a fragmentary side elevation of a vehicle wheel, partly broken away and shown in section, and illustrating the demountable rim applied thereto;

Figure 2 is a section on the line 2—2 of Figure 1;

Figure 3 is a section on the line 3—3 of Figure 1;

Figure 4 is a section on the line 4—4 of Figure 1;

Figure 5 is a section on the line 5—5 of Figure 4;

Figure 6 is a section on the line 6—6 of Figure 4; and

Figure 7 is a fragmentary plan view of the rim.

Referring more particularly to the accompanying drawing, the numeral 7 indicates generally a vehicle wheel which, in the present embodiment, is shown as a wooden wheel including the spokes 8 and felly 9. It will be understood, of course, that the invention may be applied with equal facility to other forms of wheels, such as disk wheels, without departing from the spirit or scope of the invention.

The invention comprises a felly band 10 having an annular flange 11 projecting laterally from one edge thereof and engaging one side of the felly 9, the opposite edge of said band having a rim engaging flange 12 designed to engage the demountable rim 13. This rim 13 may be of the usual type having the split joint, for the purpose of mounting and removing a tire therefrom and its sides 14 may be adapted for straight side tires, as shown in the drawing, or may be formed to receive other types of tires.

At intervals about the inner surface or periphery of the rim and intermediate the circumferential edges thereof the same is provided with inwardly extending lugs 15 each tapered to provide an inclined surface 16 designed to engage the inclined surface of a similarly shaped lug 17 formed on the outer surface of the felly band 10. The various adjacent lugs 15 and 17 are arranged to engage each other and wedge the rim in its operative or mounted position and in this manner said rim is effectively prevented from having any lateral play with respect to the wheel. The rim is provided with an elongated slot 18, which registers with a similar slot 19 formed in the felly and felly band, said registering slots being designed to receive the valve stem of a tire (not shown).

At a convenient point on the rim the same is provided with an arcuate rack 20, which may be riveted or otherwise secured to the rim and the teeth of which project into the space between the rim and the felly band 10. Adjacent the rack 20 the felly 9 is provided with a transverse opening 21 in which a bushing 22 is mounted, said bushing extending at one end through the flange 11 and being provided on said end with an enlargement 23 for receiving a head 24 of a bolt 25 which is rotatably mounted in said bushing. The bolt 25 may be secured against rotation in its bushing by means of a nut 26 threaded on the end of said bolt opposite the end 24 and engageable with a washer 27 interposed between said nut and the adjacent side of the felly 9. Intermediate the ends of the bolt 25 the same has secured thereto, in any preferred manner, a gear wheel 28 movable in a recess 29 formed in the felly 9 and engageable with the rack 20. By this construction, it will be obvious that rotation of the gear 28 in either direction will impart through the medium of the rack 20 a circumferential movement to the rim 13. The bolt 25 may be rotated by first loosening the nut 26 slightly and thereafter engaging any suitable tool, such as a crank handle or a wrench, with the head 24. By rotating the bolt in a clockwise direction, as viewed in Figure 1, it will be obvious that a similar movement will be imparted to the rim 13 and this movement may be continued until the various lugs 15 and 17 have passed beyond or out of transverse alignment with each other. Following this movement of the rim the same may be forced laterally from the wheel and disengaged therefrom in the usual well known manner. At suitable intervals about the periphery of the felly band 10 the same may be provided with studs 30, said studs being preferably introduced between adjacent lugs 17 so as to aid in properly spacing the rim from the felly band and to support said rim against any undue inward pressure thereon.

Means are further provided in connection with the invention for locking the rim in its operative position upon the wheel and preventing undue circumferential movement of said rim which might be occasioned by wear upon the various parts. This means preferably includes a projection 31 formed upon the inner periphery of the rim and engageable by the outer end of a latching pin 32, which is slidably and rotatably mounted in a bushing 33 extending transversely through the felly 11. The outer end of the latching pin 32 is provided with an eccentric head 34, which is normally disposed in the path of movement and engageable with the projection 31 to prevent a turning movement of the rim necessary to remove said rim from the wheel. This latching pin is normally held in its latching position by means of a coil spring 35 interposed between the enlarged portion of the latching pin and the inner end of the bushing 33, as clearly shown in Figure 4. By providing the latching pin 32 with the eccentric head 34, it will be obvious that while the rim is in its operative position that should any circumferential movement of the rim on the wheel be occasioned by wear on the projection 31 or head 34, the latter may be given a slight rotation so as to again tightly engage the head with said projection. In order to maintain the latching pin in an adjusted position after being rotated, a transverse pin 36 is extended through the latching member and is engageable with any one of a plurality of grooves 37 formed in the enlarged head 38 of the bushing 33. To prevent an unauthorized person from removing the rim from the wheel a locking device, conventionally illustrated at 39, is mounted in the felly 9 and includes a locking pin 40 which may be projected through the bushing 33 at a point intermediate its ends and engaged in an annular groove 41 formed in the latching member 32 and when so engaged, it will be apparent that said member cannot be moved longitudinally of the bushing in which it is mounted to withdraw the head 34 from the path of movement of the projection 31 to enable the rim to be rotated in a clockwise direction preparatory to its being removed from the wheel, as previously described.

What is claimed is:

1. In a vehicle wheel, a felly, a felly band having lugs thereon, a demountable rim having lugs engageable with the aforesaid lugs to retain the rim against lateral movement relative to the felly band, said rim also having a projection on its inner periphery, a bushing extending radially through the felly of said wheel, a latching member having both longitudinal and rotary movements with respect to said bushing and provided on one end thereof with a head disposed in the path of movement of the projection on said rim when the latter is rotated with respect to said felly band to disengage said lugs from each other, yieldable means for retaining said latching member in latching position, and means carried by the felly and extending through said bushing into engagement with said latching member to lock the same in locking position.

2. In a vehicle wheel, a felly, a felly band having lugs thereon, a demountable rim having lugs engageable with the aforesaid lugs to retain the rim against lateral movement relative to said felly band, said rim also having a projection upon its inner periphery, a bushing extending radially through the felly of said wheel, a latching member having both longitudinal and rotary movements with respect to said bushing and provided with an eccentrically disposed head engageable with the projection on said rim to limit rotation in one direction of the rim with respect to said felly band to disengage said lugs from each other, means carried by said latching member and engageable with said bushing to normally prevent rotation of said latching member and disengageable from said bushing by a longitudinal movement of said latching member to permit of rotation of said head, means for yieldably maintaining said latching member in latching position, and a locking device carried by said felly and engageable with said latching member to prevent longitudinal movement thereof in said bushing.

ALBERT WILLIAM BUMSTEAD.